(12) United States Patent
Emberty et al.

(10) Patent No.: US 7,523,322 B2
(45) Date of Patent: Apr. 21, 2009

(54) METHOD AND APPARATUS FOR SUPPLYING POWER IN AN AUTOMATED DATA STORAGE AND RETRIEVAL SYSTEM

(75) Inventors: Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 11/117,179

(22) Filed: Apr. 27, 2005

(65) Prior Publication Data

US 2005/0198539 A1 Sep. 8, 2005

Related U.S. Application Data

(62) Division of application No. 09/816,913, filed on Mar. 22, 2001, now Pat. No. 6,904,005.

(51) Int. Cl.
*G06F 1/00* (2006.01)
*H02B 1/00* (2006.01)
*H05K 7/00* (2006.01)

(52) U.S. Cl. .................. 713/300; 361/601; 361/728

(58) Field of Classification Search .................. 713/300
See application file for complete search history.

(56) References Cited

U.S. PATENT DOCUMENTS

| 4,479,198 | A | * | 10/1984 | Romano et al. | ............. 361/687 |
| 5,646,816 | A | * | 7/1997 | Alden et al. | ................. 361/622 |
| 6,018,456 | A | * | 1/2000 | Young et al. | ................. 361/684 |
| 6,148,352 | A | * | 11/2000 | Coale et al. | ................. 710/100 |
| 6,925,052 | B1 | * | 8/2005 | Reynolds et al. | ............ 370/217 |

* cited by examiner

*Primary Examiner*—Suresh K Suryawanshi
(74) *Attorney, Agent, or Firm*—Dale F. Regelman; Quarles & Brady LLP

(57) ABSTRACT

A power supply module removably disposed within an automated data storage and retrieval system. An automated data storage and retrieval system which includes one or more power supply modules removably disposed therein. An accessor movably disposed with an automated data storage and retrieval system comprising a gripper mechanism which can be releaseably attached to a power supply module. A method to supply power to an automated data storage and retrieval system. A method to monitor the operation of a power supply module removably disposed within an automated data storage and retrieval system.

7 Claims, 7 Drawing Sheets

METHOD AND APPARATUS FOR SUPPLYING POWER IN AN AUTOMATED DATA STORAGE AND RETRIEVAL SYSTEM

CROSS-REFERENCE TO RELATED APPLICATIONS

This Application is a Divisional Application claiming priority to the Application having Ser. No. 09/816,913, filed Mar. 22, 2001, now U.S. Pat. No. 6,904,005.

FIELD OF THE INVENTION

The present invention relates to a power supply module removably disposed within an automated data storage and retrieval system, an automated data storage and retrieval system which includes one or more removable power supply modules, a method to supply power to an automated data storage and retrieval system, and a method to monitor the performance of a power supply module removably disposed within an automated data storage and retrieval system.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494Media Storage Library. Some of the automated media storage libraries have dual or multiple accessors to provide a level of redundancy.

The individual components forming such an automated data storage and retrieval system require power to function. The power requirements of these various components typically include power having an alternating current ("AC") with differing voltages and frequencies, and direct current ("DC") having differing voltages. In order to supply the power required to operate such an automated data storage and retrieval system, that system typically includes one or more power components. These power components are connected to an external source of power, and transform that external power into one or more forms of power used within the system.

Occasionally, an internal power component may become unavailable, for example, if a power supply requires maintenance, upgrading, and/or repair. In the event of a power supply failure, the cause of the failure must first be ascertained before a repair can be made. What is needed is a removable/portable power supply module, a method to store, transport, use, and replace such a power supply module, and a method to monitor the performance of such a power supply module while that module is in operation.

SUMMARY OF THE INVENTION

Applicants' invention includes a power supply module removably disposed in Applicants' automated data storage and retrieval system. Applicants' power supply module includes an enclosure, a power supply internally disposed within the enclosure, at least one attachment device, a first electrical connector disposed on the enclosure and connected to the power supply, a second electrical connector disposed on the enclosure and connected to the power supply. In certain embodiments, Applicants' power supply modules further includes a data interface.

Applicants' invention further includes an automated data storage and retrieval system for storing and accessing a plurality of portable data storage media stored in a plurality of storage slots. Applicants' automated data storage and retrieval system includes one or more power components, one or more power supply module receiving slots, one more of Applicants' power supply modules removably disposed in one more of those power supply module receiving slots, one or more first power connection devices, one or more second power connection devices, and one or more accessors for accessing and transporting Applicants' power supply modules. Each of these accessors includes a gripper mechanism for releaseably attaching a power supply module to the accessor. In certain embodiments, Applicants' accessors include a information receiving device and a memory buffer.

Applicants' invention includes a method to supply power to Applicants' automated data storage and retrieval system using Applicants' power supply modules. Applicants' method includes steps to removably dispose one or more of Applicants' power supply module in one or more of the available power supply module receiving slots, supply first power having a first voltage to that power supply module, and transform that first power into the second power having one or more second voltages required to operate the various components of Applicants' system. Applicants' automated data storage and retrieval system includes a computer useable medium having computer readable program code disposed in Applicants' automated data storage and retrieval system to implement Applicants' method to supply power.

Applicants' invention further includes a method to monitor the performance of Applicants' power supply modules removably disposed within Applicants' automated data storage and retrieval system, and to remove and replace a malfunctioning module. Applicants' automated data storage and retrieval system includes a computer useable medium having computer readable program code disposed therein to implement Applicants' method to monitor performance.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
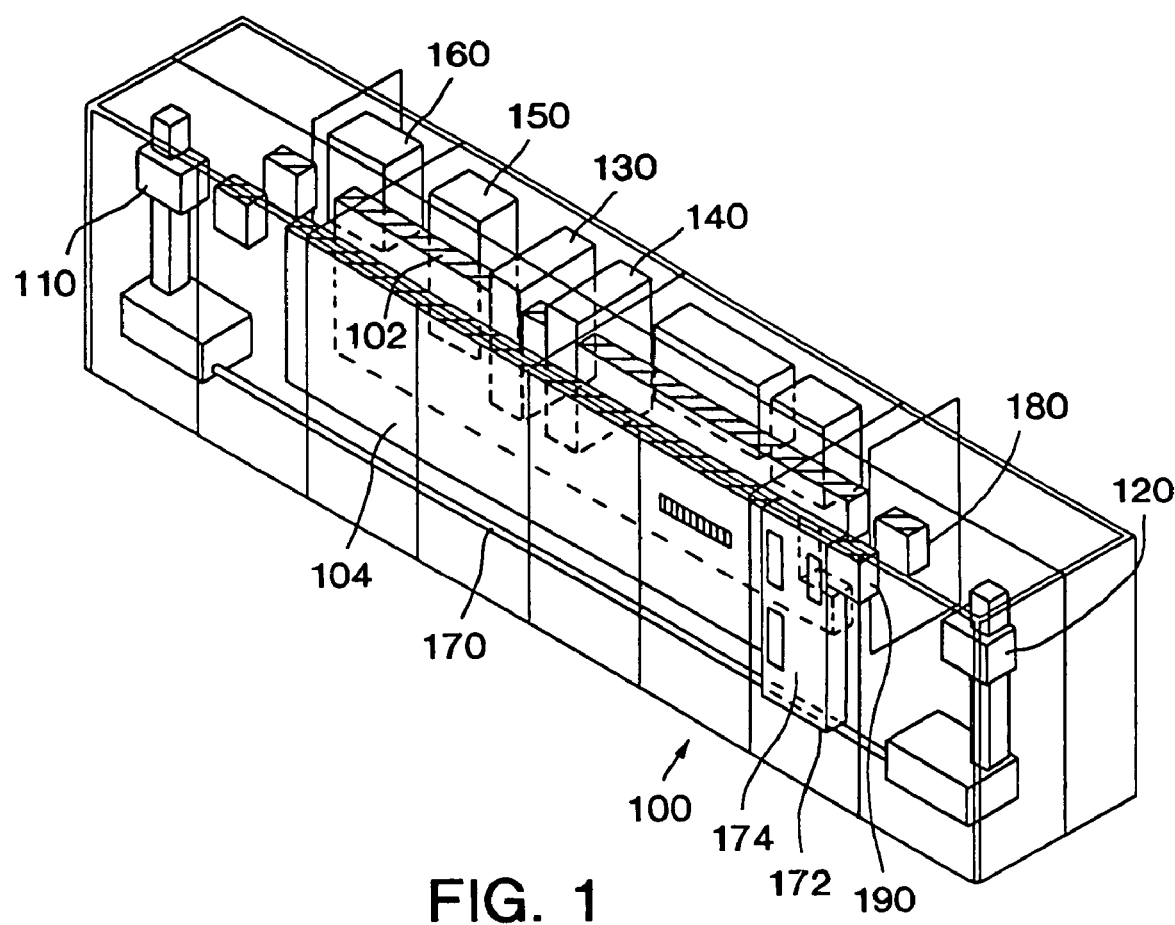
FIG. 1 is a perspective view of Applicants' automated data storage system.

Referring to FIG. 1, Applicants' automated data storage and retrieval system 100 is shown having a first wall of storage slots 102 and a second wall of storage slots 104. Data storage media are individually stored in these storage slots. The data storage media are housed within a portable container, i.e. a cartridge. Examples of such data storage media include magnetic tapes, optical disks of various types, including ROM, WORM, and rewritable, and the like.

Applicants' automated data storage and retrieval system includes one or more accessors, such as accessors 110 and 120. An accessor is a robotic device which accesses portable data storage media from first storage wall 102 or second storage wall 104, delivers that accessed media to data storage drives 130/140 for reading and/or writing data thereon, and returns the media to the proper storage slot.

In addition, and as described below, accessors 110/120 also access and transport spare portable power supply modules stored in first storage wall 102 and/or second storage wall 104. First storage wall 102 comprises a plurality of storage slots in which are stored, for example, portable data storage media and/or spare portable power supply modules. Second storage wall 104 comprises a plurality of storage slots in which are stored, for example, portable data storage media and/or spare portable power supply modules.

As shown in FIG. 1, accessors 110 and 120 travel bi-directionally along rail 170 in an aisle disposed between first wall of storage slots 102 and second wall of storage slots 104. Accessor control 160 controls accessors 110 and 120. Operator input station 150 permits an operator to communicate with Applicants' automated data storage and retrieval system 100.

Import/export port 172 include access door 174 pivotally attached to the side of system 100. Portable data storage cartridges can be placed in the system, or in the alternative, removed from the system, via port 172/access door 174. In addition, Applicants' power supply module(s) can be inserted into the system, or removed from the system, via port 172/access door 174.

Figure 2:
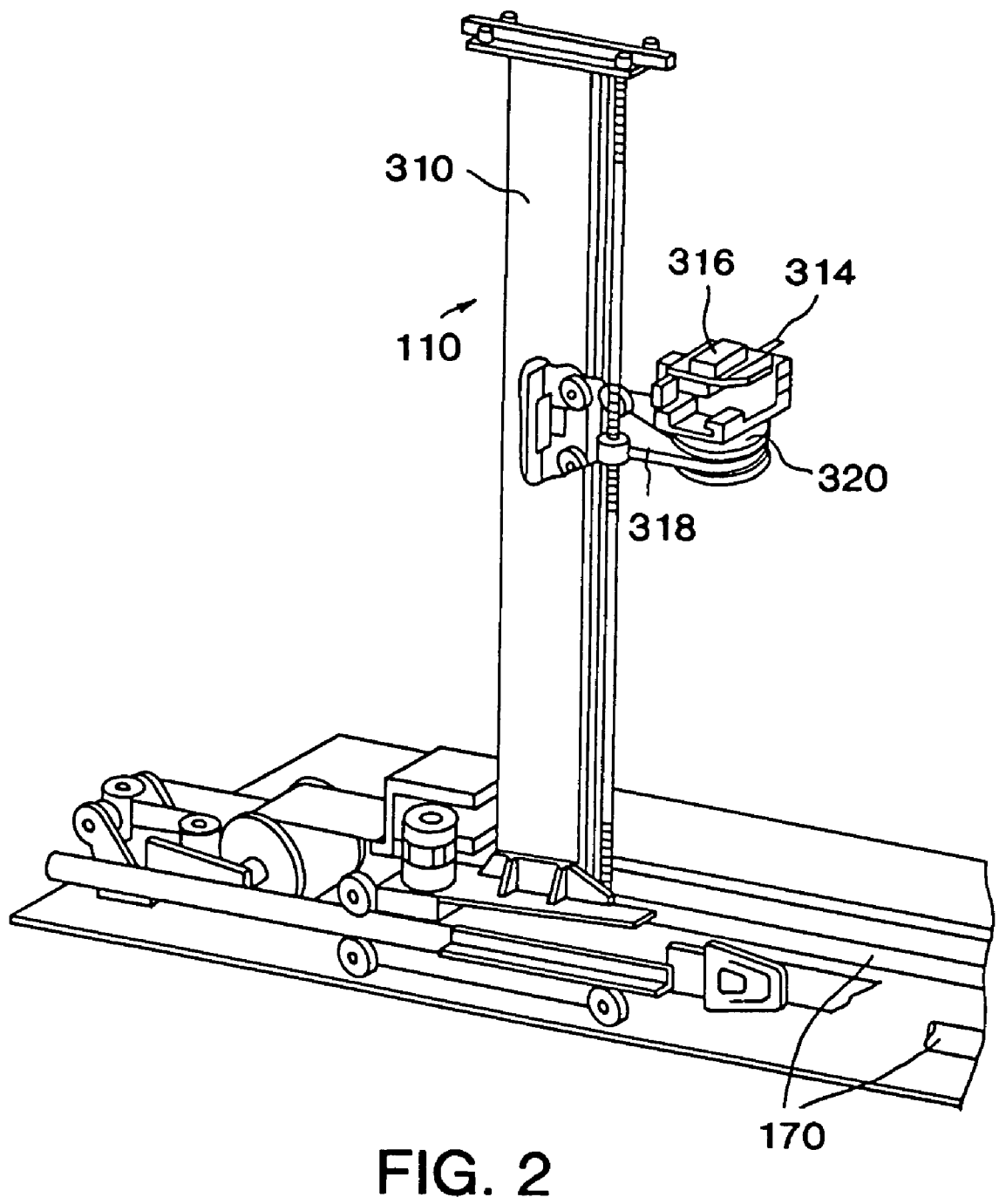
FIG. 2 is a perspective view of one embodiment of Applicants' accessor showing the gripper mechanism and the information receiving device.

Referring to FIG. 2, accessor 110 travels bi-directionally along rail system 170. In the embodiment shown in FIG. 2, rail system 170 comprises two parallel rails. Accessor 110 includes vertical pillar 310. Lifting servo section 318 moves vertically along pillar 310. Accessor 110 includes first gripper mechanism 314, second gripper mechanism 320, and information receiving device 316.

In certain embodiments of Applicants' accessor, first gripper mechanism 314 and second gripper mechanism 320 are disposed on two opposed sides of a gripping apparatus disposed on lifting servo section 318. In these embodiments, first gripper mechanism 314 can, for example, remove one of Applicants' power supply modules from a power supply module receiving slot, lifting servo section 318 can rotate, and second gripper mechanism 320 can insert a replacement power supply module into the now-vacant power supply module receiving slot.

Applicants' automated data storage and retrieval system also includes internally-disposed sources of power. In the embodiment shown in FIG. 1, Applicants' system includes power components 180 and 190. In alternative embodiments, Applicants' system includes a single power component, and in yet other embodiments Applicants' system includes a plurality of power components.

Figure 3A:
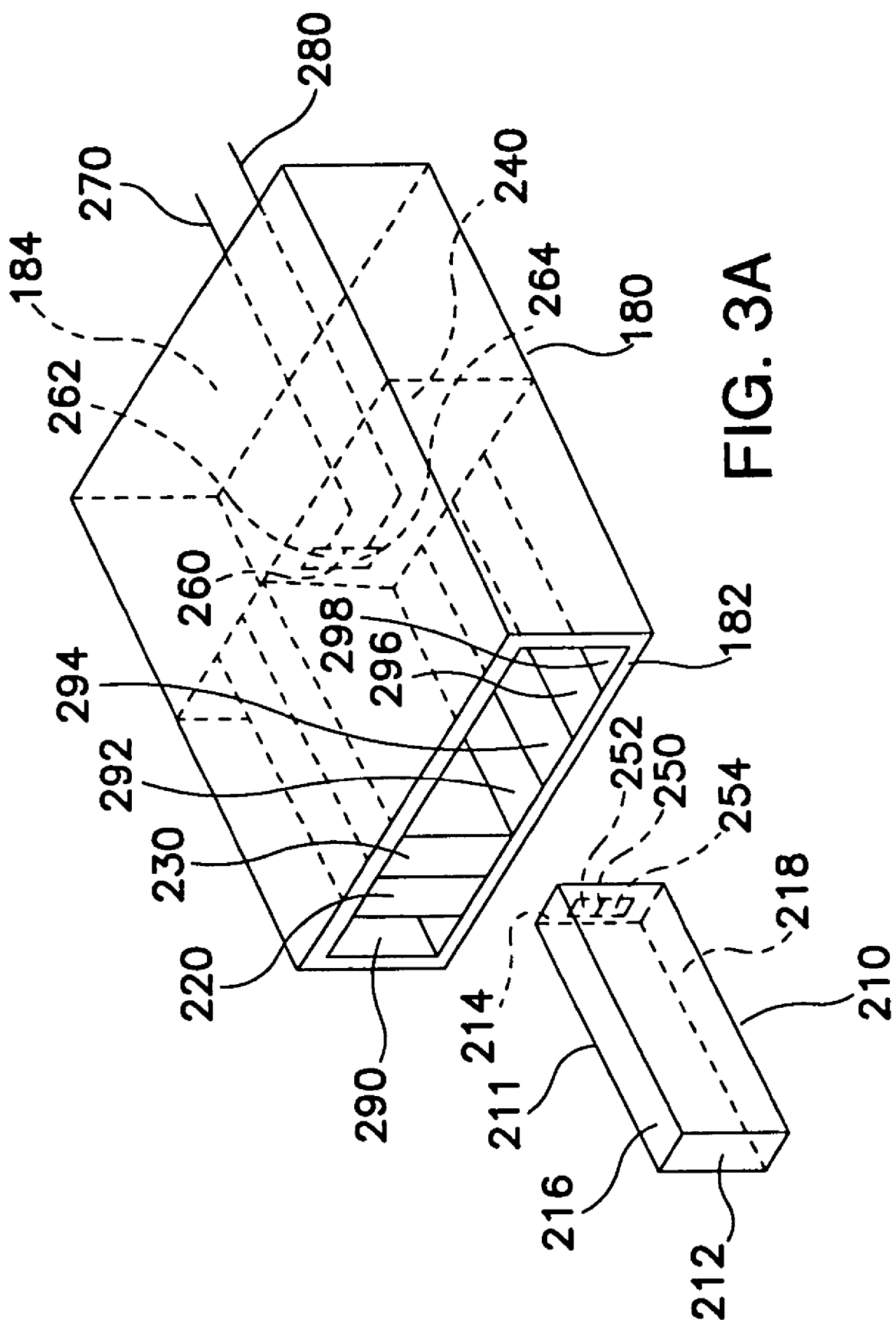
FIG. 3A is a perspective view of one embodiment of Applicants' removable power supply module, power component, and power supply receiving slot.

Referring to FIG. 3A, power source 180 comprises removable power supply modules 210, 220, and 230. In alternative embodiments, the power source component of Applicants' system comprises a single removable power supply module. In yet other embodiments, Applicants' system comprises a plurality of removable power supply modules disposed within a plurality of individual power source components, such as power source 180 (FIGS. 1, 3A) and power source 190 (FIG. 1).

Accessor 110 (FIGS. 1, 2) and/or accessor 120 (FIG. 1) can access power components 180 and 190 (FIG. 1) and, if necessary, remove one or more portable power supply module(s) disposed therein. In certain embodiments of Applicants' invention, each portable power supply module disposed within Applicants' automated data storage and retrieval system includes data interface 617 (FIG. 3B) that allows downloading of information, such as performance data, from that portable power supply module while that module is in operation. In these embodiments, each accessor includes information receiving device 316 (FIG. 2) which can download information from data interface 617, and store that information in memory buffer 480 (FIG. 4A) disposed on accessor control card 470 (FIG. 4A).

Referring to FIG. 3A, power supply module 210 comprises enclosure 211 which includes first side 212, second side 214, top 216, and bottom 218. The designations "top" and "bottom" are used for descriptive purposes only, and should not be construed as limiting. In FIG. 3A, power source component 180 includes portable power supply modules 210, 220, and 230. Module 210 is shown removed from power component 180, and modules 220 and 230 are shown disposed within power component 180. Power component 180 includes vacate power supply module receiving slots 290, 292, 294, 296, and 298.

In the embodiment shown in FIG. 3A, power source component 180 includes backplane 240. The individual portable power supply modules disposed within power component 180 are removably attached to the backplane 240 using plug-in connector assemblies. In the embodiment shown in FIG. 3A, backplane connector is internally disposed within power component 180 about midway between front 182 and rear 184. In other embodiments, backplane 240 is disposed adjacent rear 184.

Referring again to FIG. 3A, first electrical connector 250 disposed on second side 214 of module 210 is a module plug-in connector, and second electrical connector 260 disposed on backplane 240 is a backplane plug-in connector. Electrical contact between the connectors 250 and 260, and thus between power supply module 210 and power component 180, is effected when connector 250 is releaseably connected to connector 260. In certain embodiments of Applicants' invention, connector 250 has a "male" configuration and connector 260 has a "female" configuration. In other embodiments, connector 250 has a "female" configuration and connector 260 has a "male" configuration.

Connector 250 includes input power component 252 and output power component 254. Connector 260 includes input power component 262 and output power component 264. Connectors 250 and 260 releaseably interconnect such that input power component 252 releaseably connects to input power component 262. Similarly, output power component 254 releaseably connects to output power component 264.

First power 290 (not shown in FIG. 3A) having a first voltage is supplied to power component 180 via conductor 270. Conductor 270 connects to a first power bus (not shown in FIG. 3A) which receives first power from an external source (not shown in FIG. 3A). First power 290 is supplied to removable power supply module 210 via connectors 252/262. Removable power supply module 210 transforms first power 290 into second power 292 (not shown in FIG. 3A). Second power 292 comprises one or a plurality of second voltages. Second power 292 is supplied to conductor 280 via connectors 254/264. Conductor 280 provides second power 292 to a power bus (not shown in FIG. 3A) internally disposed within Applicants' automated data storage and retrieval system. Those skilled in the art will appreciate that in embodiments of Applicants' invention where second power 292 comprises more than one voltage, conductor 280 comprises more than one power cable with each such individual power cable supplying second power having one voltage.

In certain embodiments, first power 290 comprises DC power. In certain of these embodiments, first power 290 has a voltage of about +38 volts. In alternative embodiments, first power 290 comprises AC. In certain of these embodiments, first power 290 has a voltage between about +110 volts and about +220 volts. In these embodiments, first power 290 has a frequency of between about 50 and about 60 hertz. In certain embodiments, second power 292 comprises DC power. In these embodiments, second power 292 has a voltage of about +12 volts, about −12 volts, about +5 volts, about −5 volts, and combinations thereof.

Figure 3B:
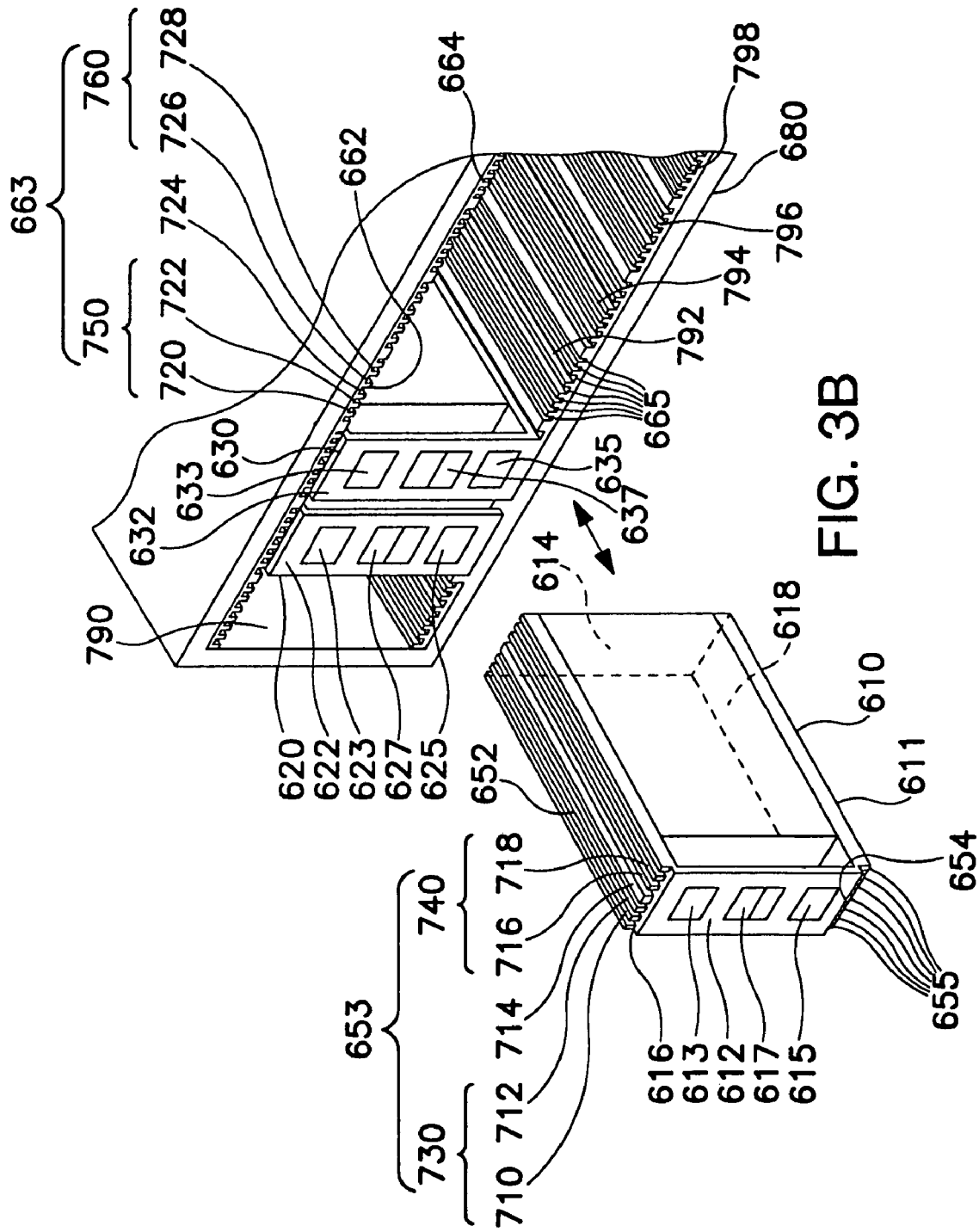
FIG. 3B is a perspective view of a second embodiment of Applicants' removable power supply module, power component, and power supply receiving slot.
Figure 4A:
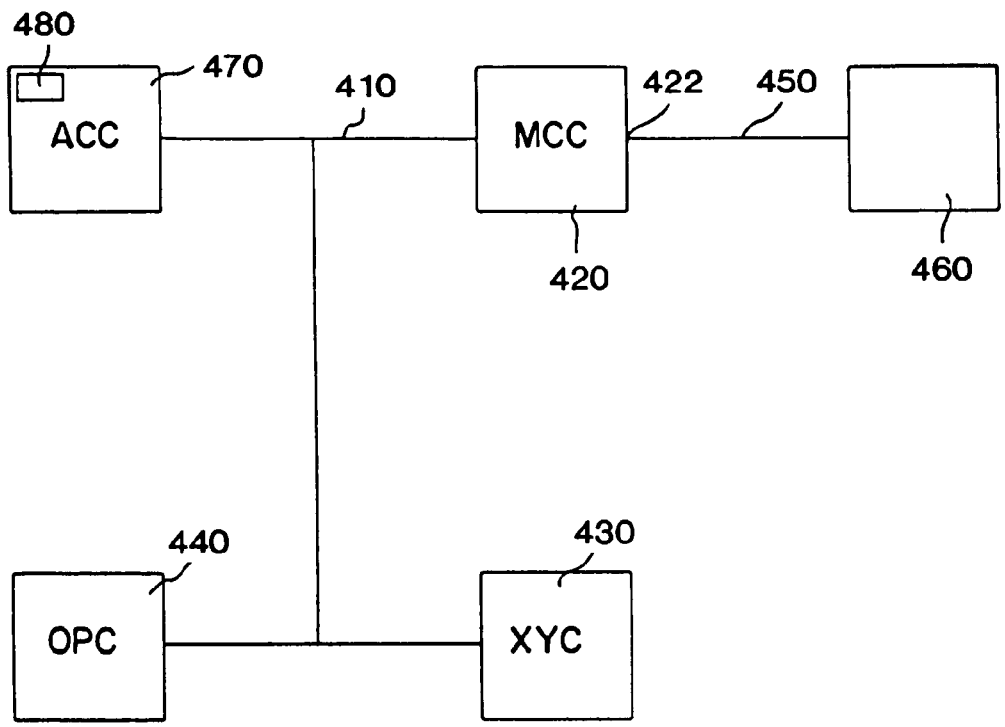
FIG. 4A is a schematic showing a first embodiment of the communication bus disposed within Applicants' automated data storage and retrieval system.

Referring to FIG. 3B, power component 680 comprises removable power supply modules 610, 620, and 630, and vacant power supply module receiving slots 790, 792, 794, 796, and 798. Removable power supply module 610 comprises enclosure 611 which includes first side 612, second side 614, top 616, and bottom 618. The terms "top" and "bottom" are used for descriptive purposes only, and should not be construed as limiting.

First attachment device 613 is disposed on first side 612. In certain embodiments, first attachment device comprises a parallelepiped having one face disposed on first side 612 and extending outwardly therefrom. In other embodiments, first attachment device comprises a cylinder having one end disposed on first side 612 and extending outwardly therefrom. In other embodiments, first attachment device 613 comprises an aperture disposed through first side 612. In these embodiments, the shape of the aperture is selected from the group consisting of a cube, a parallelepiped, and a cylinder.

In the embodiment shown in FIG. 3B, removable power supply module 610 includes a second attachment device, namely second attachment device 615 disposed on first side 612. In certain embodiments, second attachment device 615 comprises a parallelepiped having one face disposed on first side 612 and extending outwardly therefrom. In alternative embodiments, second attachment device 615 comprises a cylinder having one end disposed on first side 612 and extending outwardly therefrom. In yet other embodiments, second attachment device 615 comprises an aperture disposed through first side 612. In these embodiments, the shape of the aperture is selected from the group consisting of a cube, a parallelepiped, and a cylinder. In embodiments having two attachment devices disposed on enclosure 611, those two attachment devices may be of the same type, i.e. a member extending outwardly from side 612 or an aperture disposed in side 612, and of the same dimension, or those two attachment devices may differ in type, dimension, or both.

Data interface 617 is disposed on first side 612 of removable power supply module 610. When removable power supply module 610 is removeably attached to gripper mechanism 314 (FIG. 2) disposed on accessor 110 (FIGS. 1, 2), data interface 617 is disposed adjacent information receiving device 316 such that information receiving device 316 can download first information from removable power supply module 610 while module 610 is disposed in, and operating in, power component 680. Such first information includes, first power being supplied to module 610, second power being supplied by module 610, internal temperatures, power conversion efficiencies, switching frequencies, and the like. U.S. Pat. No. 5,606,467 describes an interconnection between such a data interface and such a information receiving device, and is hereby incorporated by reference.

The interconnection between data interface 617 and information receiving device 316 can comprise a physical connection or a wireless communication link. Using such a wireless communication link, information is transferred from data interface 617 to information receiving device 316 using infrared frequencies, light in the visible spectrum, radio frequencies between about 1 MHz and about 10 GHz, and combinations thereof.

In the embodiment shown in FIG. 3B, connector 652 comprises plurality of fins 653. Plurality of fins 653 includes individual fins 710, 712, 714, 716, and 718. Connector 662 comprises plurality of slots 663. Plurality of slots 663 includes individual slots 720, 722, 724, 726, and 728. Connector 652 slidingly mates with connector 662. Similarly, connector 654 comprises plurality of fins 655. Connector 664 comprises plurality of slots 665. Connector 654 slidingly mates with connector 664. In certain embodiments, connector 662 is in electrical contact with a first power bus (not shown in FIG. 3B) internally disposed within Applicants' system, and which supplies first power 290 (not shown in FIG. 3B) from an external source (not shown in FIG. 3B. In these embodiments, when removable power supply module 610 is disposed within power component 680, power component 680 supplies first power 290 (not shown in FIG. 3B) to module 610 via connectors 652/662. Also in these embodiments, removable power supply module 610 provides second power 292 (not shown in FIG. 3B) to power component 680 via connectors 654/664.

In alternative embodiments, connectors 654/664 supply first power 290 (not shown in FIG. 3B) to removable power supply module 610 from power component 680. In these alternative embodiments, connectors 652/662 supply second power 292 (not shown in FIG. 3B) from removable power supply module 610 to power component 680.

In yet other embodiments, first power 290 (not shown in FIG. 3B) is supplied to removable power supply module 610 from power component 680, and second power 292 (not shown in FIG. 3B) is supplied to power component 680 from removable power supply module 610, via connectors 652/662. In these embodiments, fins 710 and 712 comprise first portion 730 of connector 652. Fins 716 and 718 comprise second portion 740 of connector 652. Similarly, slots 720 and 722 comprise first portion 750 of connector 662. Slots 726 and 728 comprise second portion 760 of connector 662. First portion 730 slidingly mates with first portion 750. Similarly, second portion 740 slidingly mates with second portion 760. In these embodiments, first power 290 (not shown in FIG. 3B) is supplied to removable power supply module 610 from power component 680 via first portions 730/750. Second power 292 (not shown in FIG. 3B) is supplied by removable power supply module 610 to power component 680 via second portions 740/760.

In certain embodiments shown in FIG. 3B, first power 290 comprises DC power. In certain of these embodiments, first power 290 has a voltage of about +38 volts. In alternative embodiments, first power 290 comprises AC. In certain of these embodiments, first power 290 has a voltage between about +110 volts and about +220volts. In these embodiments, first power 290 has a frequency of between about 50 and about 60 hertz. In certain embodiments, second power 292 comprises DC power. In these embodiments, second power 292 has a voltage of about +12 volts, about −12 volts, about +5 volts, about −5 volts, and combinations thereof.

Referring to FIG. 4A, serial protocol bus 410 disposed within Applicants' automated data storage and retrieval system is in communication with accessor control card 470, master communications control card 420, X/Y movement control card 430, and operator control panel control card 440. In certain embodiments of Applicants' invention serial protocol bus 410 comprises an ethernet protocol bus or a CAN-BUS protocol bus. Accessor control card 470 includes memory buffer 480, and is disposed on accessor 110 (FIGS. 1, 2). X/Y movement control card 430 is disposed within system controller 160 (FIG. 1). Operator panel control card is disposed within operator control panel 150 (FIG. 1).

Figure 4B:
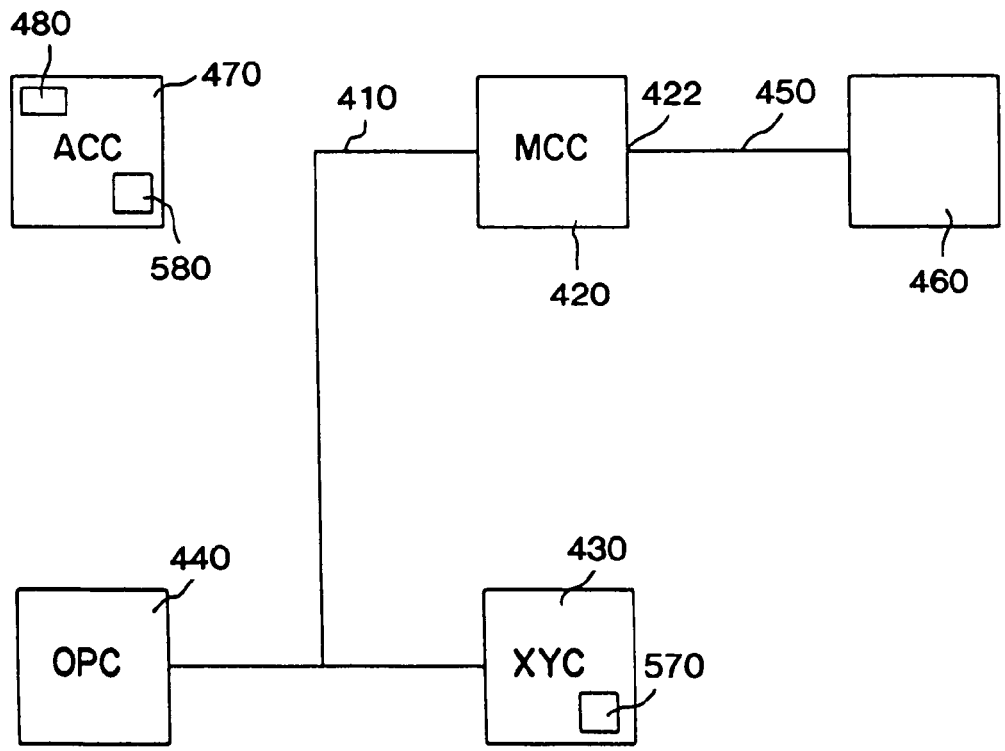
FIG. 4B is a schematic showing a second embodiment of the communication bus disposed within Applicants' automated data storage and retrieval system.

Referring to FIG. 4B, in an alternative embodiment of Applicants' invention X/Y movement control card 430 further includes wireless communication device 570, and accessor control card 470 further includes wireless communication device 580. In this wireless communication embodiment, X/Y control card 430 provides control commands by wireless communication to accessor 110 (FIGS. 1 and 2) via accessor control card 470 disposed within accessor 110. In certain embodiments of Applicants' invention, such wireless communication is conducted over frequencies between about 800 MHz and about 1.0 GHz. In other embodiments, such wireless communication is conducted using emissions within the infrared spectrum.

Communication control card 420 includes external interface connection 422. Using external interface connection 422, the data stored in revolving memory buffer 480 resident on accessor control card 470 can be accessed by external computer 460. Communication link 450 connects external computer 460 and communication controller 420 via external interface connection 422. In various embodiments of Applicants' invention, communication link 450 comprises an RS 232 cable, a local area network, a private wide area network, a public wide area network, i.e. the Internet, and the like.

Figure 5:
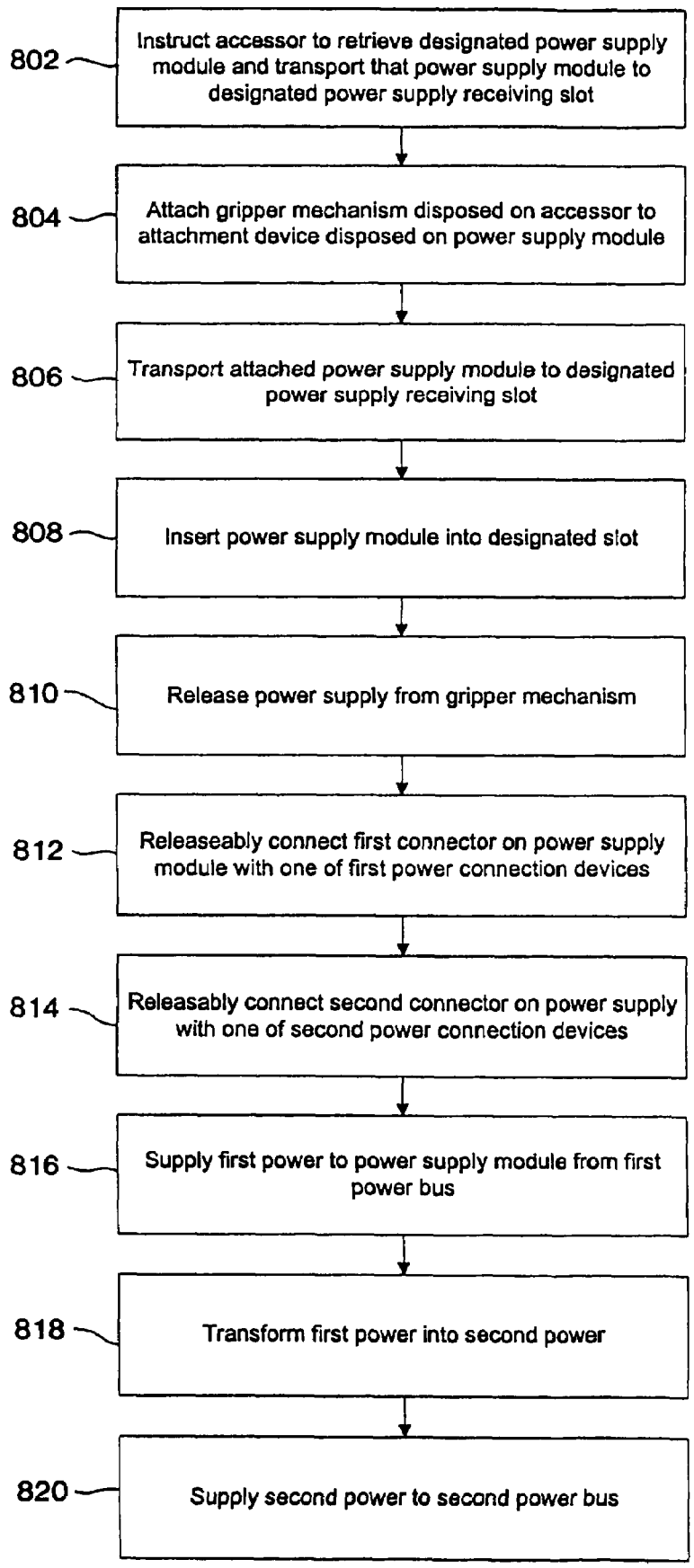
FIG. 5 is a flow chart summarizing the steps of Applicants' method to supply power to Applicants' automated data storage and retrieval system.

Applicants' invention includes a method to supply power to an automated data storage and retrieval system. FIG. 5 summarizes the steps in Applicants' method to supply power. In step 802, the X/Y movement controller 430 (FIG. 4A) instructs an accessor movably disposed with the system, such as accessor 110 (FIGS. 1, 2), to retrieve a designated power supply module, such as power supply module 610 (FIG. 3B) from a storage slot, such as one of the storage slots disposed in first storage wall 102 (FIG. 1), and transport that designated power supply module to a designated power supply receiving slot, such as slot 792 (FIG. 3B).

In step 804, the designated accessor attaches gripper mechanism 314 (FIG. 2) to attachment device 613 and/or attachment device 615 on power supply module 610. In step 806, designated accessor 110 transports attached power supply module 610 to power supply receiving slot 792 disposed in power component 680 (FIG. 3B). In step 808, accessor 110 inserts power supply module 610 into slot 792. In step 810, accessor 110 releases attachment device 613/615 from gripper mechanism 314.

In accord with step 816, by inserting power supply module 610 into slot 792 in step 812, connector 652 slidingly mates with power connection device 662 thereby supplying first power 290 (not shown in FIGS.) from conductor 270 (FIG. 3A) to power supply module 610. In step 818, power supply 610 transforms first power 290 having a first voltage into second power 292 (not shown in FIGS.) having a second voltage. In accord with step 814, by inserting power supply module 610 into slot 792, connector 654 slidingly mates with power connection device 664. Power supply 610 supplies second power 292 to second power bus 280 (FIG. 3A).

Applicants' automated data storage and retrieval system includes a computer useable medium having computer readable program code disposed therein for supplying power within the system. Applicants' computer readable program code comprises a series of computer readable program steps to monitor the power requirements of Applicants' automated data storage and retrieval system. Applicants' computer readable code further comprises a series of computer readable program steps to: instruct an accessor to retrieve a designated power supply module and transport that module to a designated power supply module receiving slot by first attaching the gripper mechanism disposed on the designated accessor to the attachment device disposed on the designated power supply module, transport the attached power supply module to the designated power supply module receiving slot, insert the designated power supply module into the designated slot, release the designated power supply module from the gripper mechanism, supply first power having a first voltage to the designated power supply module, cause the designated power supply module to transform that first power into second power having a second voltage, and supply that second voltage to a second power bus disposed within Applicants' system.

Figure 6:
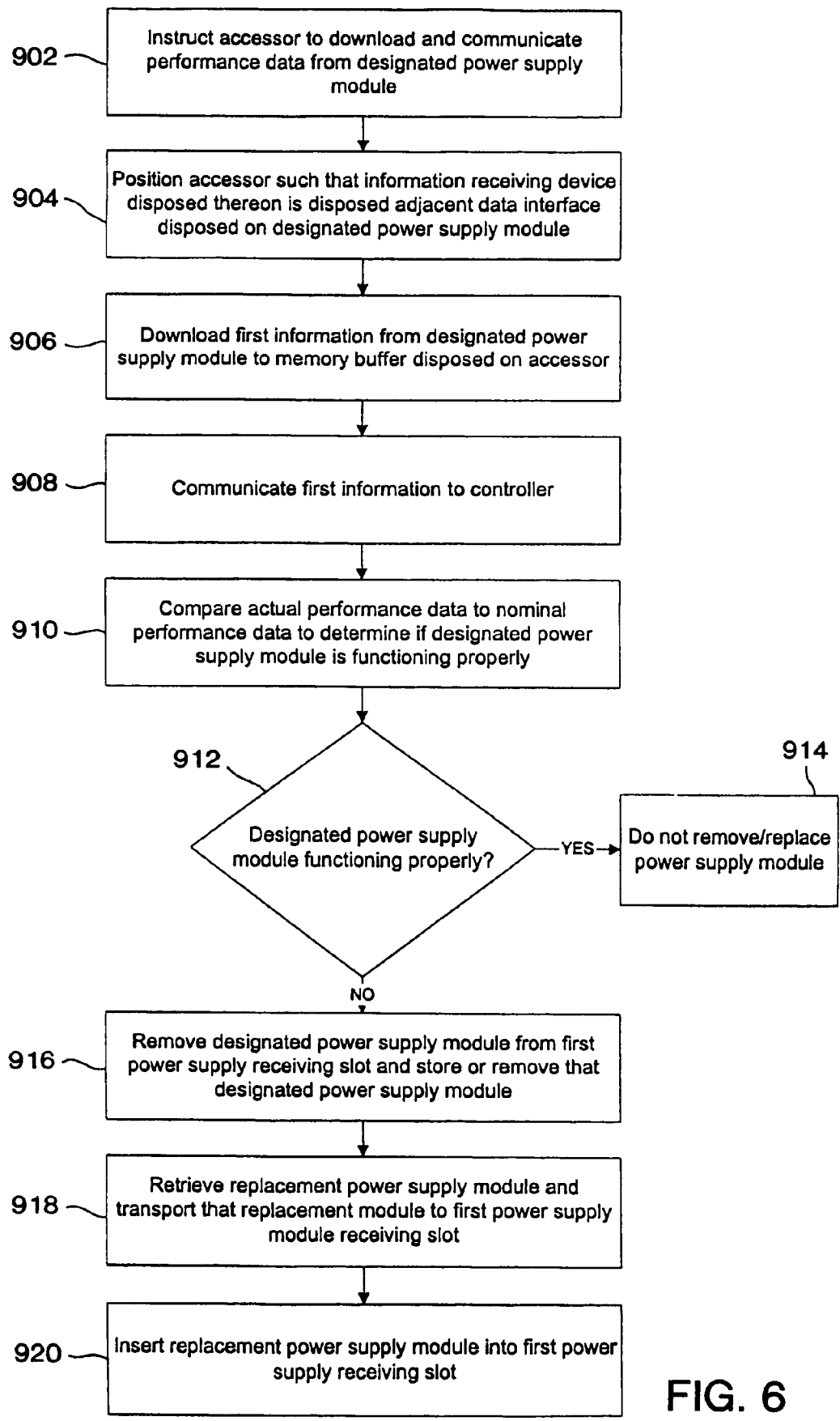
FIG. 6 is a flow chart summarizing the steps of Applicants' method to monitor the performance of Applicants' removable power supply module while that module is operating in Applicants' automated data storage and retrieval system.

Applicants' invention includes a method to evaluate the operational performance of the power supply modules removeably disposed within Applicants' automated data storage and retrieval system. FIG. 6 summarizes the steps in Applicants' method.

In step 902, the X/Y controller 430 (FIGS. 4A, 4B) instructs accessor 110 to download, store in memory buffer 580 (FIGS. 4A, 4B), and communicate first information, such as actual performance data, from a designated power supply module, such as power supply module 610, and communicate that first information to master communication controller 420 (FIGS. 4A, 4B). Such first information includes, first power input, second power output, internal temperatures, power conversion efficiencies, power factor, switching frequencies, and the like.

In step 904, accessor 110 is positioned such that information receiving device 314 (FIG. 2) is disposed adjacent data interface 617 disposed on power supply module 610. In step 906 first information is downloaded from power supply module 610 to memory buffer 580. In step 908, that first information is communicated to master communication controller 420. In the embodiment shown in FIG. 4A, that first information is communicated via serial data bus 410. In the embodiment shown in FIG. 4B, that first information is communicated by accessor 110 to X/Y controller 430 using wireless communication devices 570 and 580. In this embodiment, X/Y controller 430 then communicates the first information to master communication controller 420 via bus 410.

In step 910, the first information is compared to second information, such as desired or nominal performance specifications. In step 912 the performance of power supply module 610 is determined to be either acceptable or unacceptable. If the performance is acceptable, then power supply module 610 is not removed and replaced.

On the other hand, if the performance of power supply module 610 is determined to be unacceptable in step 912, then in step 916 power supply module 610 is removed from power supply receiving slot 792. Malfunctioning power supply module 610 is then either stored in one of the storage slots disposed in first storage wall 102 (FIG. 1) or second storage wall 104 (FIG. 1), or in the alternative, power supply module 610 is transport to import/export port 172 and is removed from system 100. In step 918, accessor 110 is instructed to retrieve a replacement power supply module from storage, and to transport that replacement power supply module to power supply module receiving slot 792. In step 920, the replacement power supply module is inserted into the first power supply receiving slot 792.

In an alternative embodiment, accessor 110 is instructed to retrieve a replacement power supply module prior to monitoring the performance of power supply module 610. In this embodiment, the replacement power supply module is, for example, removably attached to first gripper mechanism 314. Subsequently, second gripper mechanism 320 attached to power supply module 610 and removes that module from power supply receiving slot 792. Lifting servo section 318 then rotate, and first gripper mechanism 314 inserts the replacement power supply module into the now-vacant power supply module receiving slot 792. Accessor 110 then either stores malfunctioning power supply module 610 in a storage slot disposed in first wall 102/second wall 104 (FIG. 1), or delivers power supply module 610 to import/export port 172 (FIG. 1) for removal from system 100.

Applicants' automated data storage and retrieval system includes a computer useable medium having computer readable program code disposed therein for evaluating the performance of the power supply modules removably disposed within Applicants' system. Applicants' computer readable program code comprises a series of computer readable program steps to evaluate the performance of the power supply modules removably disposed within Applicants' system while those modules are in operation. Applicants' computer readable code further comprises a series of computer readable program steps to: instruct an accessor to download, store, and communicate first information, such as performance data, from a designated power supply module to a controller, to evaluate that first information in order to determine of that designated power supply module is functioning properly, and to remove and replace that designated power supply module in the event that module is not performing properly.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for supplying power in an automated data storage and retrieval system, wherein said automated data storage and retrieval system includes an external power source which supplies first power having a first voltage and one or a plurality of power supply module receiving slots, said method comprising the steps of:

removably disposing a power supply module in one of said one or a plurality of power supply module receiving slots, wherein said power supply module comprises an enclosure and a power supply disposed within said enclosure, wherein said power supply transforms said first power into second power having a second voltage;

supplying said first power to said power supply module; and transforming said first power into said second power.

2. The method of claim 1, wherein said power supply module further comprises an attachment device disposed on said enclosure, and wherein said automated data storage and retrieval system further comprises one or a plurality of robotic accessors moveably disposed therein, each of said one or a plurality of accessors comprising a gripper mechanism, wherein said removably disposing step further comprises the steps of:

attaching said gripper mechanism disposed on one of said one or a plurality of accessors to said attachment device disposed on said power supply module;

transporting said power supply module to said one of said one or a plurality of power supply module receiving slots;

inserting said power supply module into said one of said one or a plurality of power supply module receiving slots; and releasing said attachment device from said gripper mechanism.

3. The method of claim 1, wherein said power supply module further comprises a first connector disposed on said enclosure and connected to said power supply, and wherein said automated data storage and retrieval system further comprises a first power bus internally disposed therein and providing said first power, a second power bus internally disposed therein and providing said second power, one or a plurality of first power connection devices connected to said first power bus, one or a plurality of second power connection devices connected to said second power bus, said method further comprising the steps of:

releaseably connecting said first connector to one of said one or a plurality of first power connection devices; and releaseably connecting said first connector to one of said one or a plurality of second power connection devices.

4. The method of claim 3, wherein said power supply module further comprises and a second connector disposed on said enclosure and connected to said power supply, wherein said releaseably connecting steps comprise the steps of:

releaseably connecting said first connector to one of said one or a plurality of first power connection devices; and releaseably connecting said second connector to one of said one or a plurality of second power connection devices.

5. An automated data storage and retrieval system comprising a computer useable medium having computer readable program code disposed therein for providing power within said automated data storage and retrieval system, wherein said automated data storage and retrieval system comprises an external power source which supplies first power having a first voltage and one or a plurality of power supply module receiving slots, the computer readable program code comprising a series of computer readable program steps to effect:

removably disposing a power supply module in one of said one or a plurality of power supply module receiving slots, wherein said power supply module comprises an enclosure and a power supply disposed within said enclosure, wherein said power supply transforms said first power into second power having a second voltage;

supplying said first power to said power supply module; and transforming said first power into said second power.

6. The automated data storage and retrieval system of claim 5, wherein said automated data storage and retrieval system further comprises one or a plurality of accessors moveably disposed therein, each of said one or a plurality of accessors comprising at least one gripper mechanism, and wherein said power supply module further comprises an attachment device disposed on said enclosure, a first connector disposed on said enclosure and connected to said power supply, and a second connector disposed on said enclosure and connected to said power supply, said computer readable program code further comprising a series of computer readable program steps to effect:

releaseably attaching the gripper mechanism disposed on one of said one or a plurality of accessors to said attachment device;

transporting said power supply module to said one of said one or a plurality of power supply module receiving slots; and inserting said power supply module into said one of said one or a plurality of power supply module receiving slots; and releasing said attachment device from said gripper mechanism.

7. The automated data storage and retrieval system of claim 6, wherein said automated data storage and retrieval system further comprises a first power bus internally disposed therein and providing said first power, a second power bus internally disposed therein and providing said second power, one or a plurality of first power connection devices connected to said first power bus, and one or a plurality of second power connection devices connected to said second power bus, said computer readable program code further comprising a series of computer readable program steps to effect:

releaseably connecting said first connector to one of said one or a plurality of first power connection devices; and releaseably connecting said second connector to one of said one or a plurality of second power connection devices.

* * * * *